Feb. 23, 1971  H. KLINGEL  3,564,706
COMBINATION MILLING MACHINE AND NIBBLER
AND METHOD FOR CONTOUR CUTTING
Filed May 22, 1969  2 Sheets-Sheet 1

INVENTOR.
HANS KLINGEL

BY

McGlew & Toren
ATTORNEYS

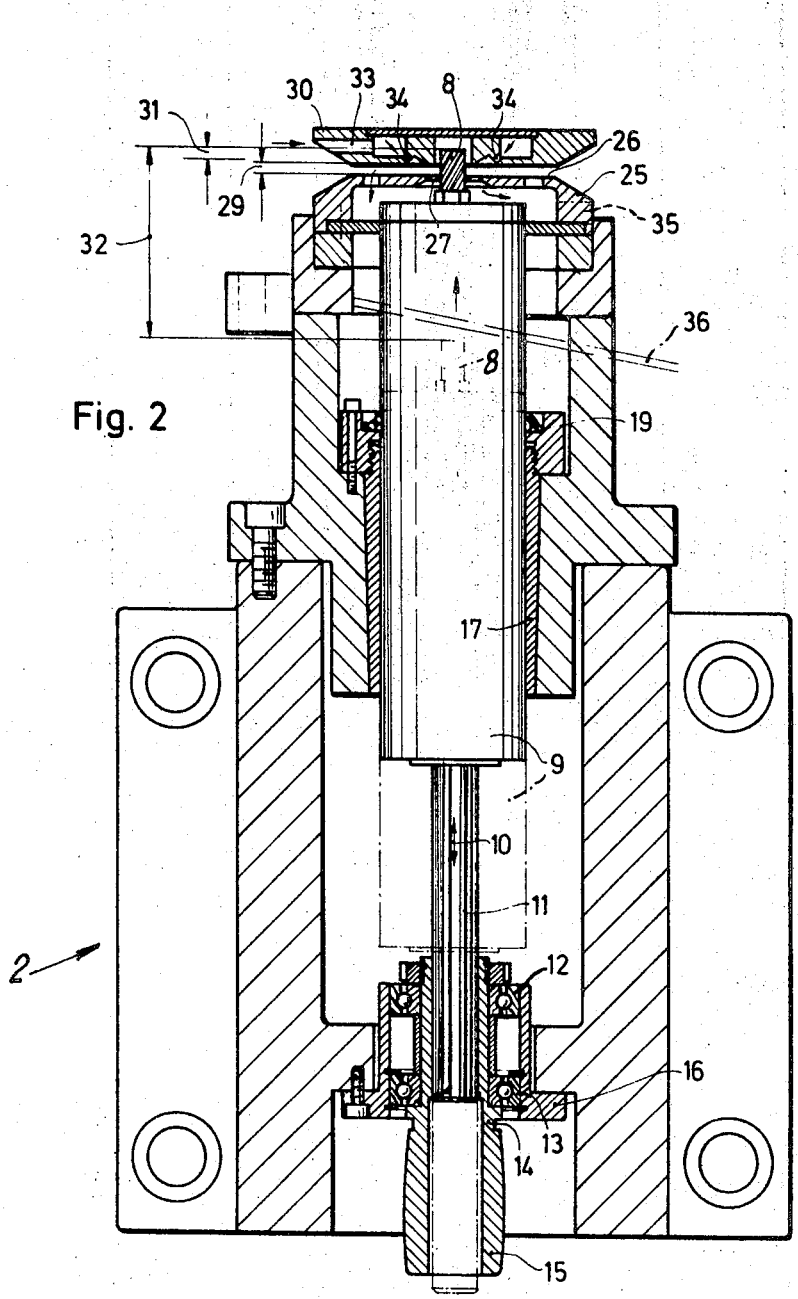

United States Patent Office 3,564,706
Patented Feb. 23, 1971

3,564,706
COMBINATION MILLING MACHINE AND NIBBLER AND METHOD FOR CONTOUR CUTTING
Hans Klingel, Korntal, near Stuttgart, Germany, assignor to Firma Trumpf & Co., Stuttgart-Weilimdorf, Germany
Filed May 22, 1969, Ser. No. 826,905
Claims priority, application France, May 28, 1968, 153,123
Int. Cl. B23p 23/00
U.S. Cl. 29—564                                     10 Claims

ABSTRACT OF THE DISCLOSURE

A combination milling machine and nibbler includes a workpiece support and guide with a nibble punch mounted above the guide and driven by a separate punch motor for operation on a workpiece preferably for forming an initial contour or outline on the workpiece and a milling cutter arranged below the workpiece support and being movable to an operative position for forming the final contour of the workpiece to the exact dimensions required.

SUMMARY OF THE INVENTION

This invention relates, in general, to metal forming machines and to a method of operating such machines and, in particular, to a new and useful combination milling machine and nibbler and to a method of contour cutting.

For the contour cutting of shaped parts, for example, templates used in automobile construction, high surface accuracies are usually demanded. This means that for working out of the full, the machine must be of very sturdy and rigid construction and, in addition, the rates of feed must not be too high. Frequently, a coarse-toothed milling cutter is used for pre-cutting and a finer cutter is used for the final cutting. With such a method, however, the machine must be operated at a low rate feed and there must be a sturdy machine frame since the required chipping work calls for a corresponding cutter diameter and hence relatively high feed frame forces.

An object of the present invention is to develop a combination milling machine and nibbler having a high chipping output and which produces a milled edge of high surrace accuracy. This is solved in accordance with the invention by providing a nibble device within the milling machine and arranged in respect to a milling cutter such that the cutter and the nibble can be alternately moved into an operative position in respect to the workpiece. Although the machine of the invention is arranged such that basically two operations are successively performed, there results as a whole, a much greater chipping output and hence a shorter operating time than in a milling machine which is able to cut the profile or contour in a single operation. The reason for this is that the nibbler performs a very high percentage of the total chipping. The nibbler is capable of pre-machining the profile except for a narrow edge strip which consists essentially of the so-called lands of the nibble operation. This narrow edge can be removed with a fine-toothed fast rotating cutter. Such a cutter can be mounted on a machine of relatively light construction and produces a smooth contour as required.

In a preferred arrangement of the invention, the cutter and the nibble punch are arranged coaxially and the cutter and the nibbler are mounted for retractable movement. The nibble punch may be mounted for movement into and out of engagement with the workpiece along with the cutter and it is preferably in an inoperative position when the cutter is in an operative position. Depending on the specific design of the machine after completion of the nibble operation, the nibble punch may be, for example, in its upper dead center position and the cutter may be mounted so that it may be pivoted to the axis of the nibble tool or fed along the axis. In the case of the pivoted cutter construction, it is also possible to displace such a cutter in an axial direction to get into the most favorable cutting position. With an automatic feed, it is particularly appropriate if the cutter is connected with a pneumatic or hydraulic feed device and a corresponding manual or automatic control is provided for moving it into an operative position or into a neutral or non-operative position.

The machine of the invention preferably includes a separate drive motor for the nibbler and the cutter and the die of the nibble is designed so that it may be removed or pivoted between an operative and non-operative position. The cutter is advantageously made to a greater diameter than the nibbler tool. In a contour milling machine having an automatic control, such as a hydraulic, electrical, mechanical, or even a photoelectrical or numerical and, using a coaxial arrangement of the cutter and nibbler punch, it is possible when replacing the punch by a cutter of only slightly larger diameter to retrace the desired contour without any new adjustment and thus to remachine or finish machine the workpiece. It suffices if the diameter of the cutter is two to three-tenths of a millimeter larger for such purposes. Such a construction is of great advantage especially in numerically controlled machines, since the same program can be used for both operations without modification. In the case of templates or drawings, one specimen or copy is sufficient for both operations. A transposition of the two working spindles is therefore not necessary and the full working range of the machine is preserved.

According to a further characteristic of the invention, the cutter and the nibble tool have a vertical axis and a pivotal chip chute is arranged below the cutter to transfer the chips out of the operating range. Such a pivotal chute is arranged to lead the chips out laterally. The device is of advantage for the cutter especially in the case of a sensitive hydraulic spstem because it prevents the chips from dropping onto the hydraulic parts. A chip evacuation device arranged on the machine is also of advantage for such an arrangement.

A method of contour cutting in accordance with the invention comprises pre-shaping to the desired contour using a nibble tool and then final shaping to the final contour using a miller to re-cut to the exact dimensions while the workpiece remains in the same fixture during both operations and while the nibble tool and the cutter are successively moved into operative positions.

Accordingly, it is an object of the invention to provide an improved milling machine having a nibbler thereon which is advantageously operated from its own motor and wherein the machine advantageously includes means for guiding the workpiece into successive association with the nibbler and/or milling cutter.

A further object of the invention is to provide an improved method of contour cutting a workpiece which includes mounting the workpiece in a guide of a machine and maintaining it in the guide first while a nibbler is moved over the workpiece to form a rough contour and then while a milling cutter is moved over the workpiece to form a final contour and exact finish.

A further object of the invention is to provide a combined milling and nibbler machine which is simple in design, rugged in construction and economical to manufacture.

The various features of novelty which characterize the invention are pointed out with particularity in the claims annexed to and forming a part of this specification. For

BRIEF DESCRIPTION OF THE DRAWINGS

In the drawings:

FIG. 2 is an enlarged partial vertical section of a portion of the machine indicated in FIG. 1;

DETAILED DESCRIPTION OF THE PREFERRED EMBODIMENT

Figure 1:
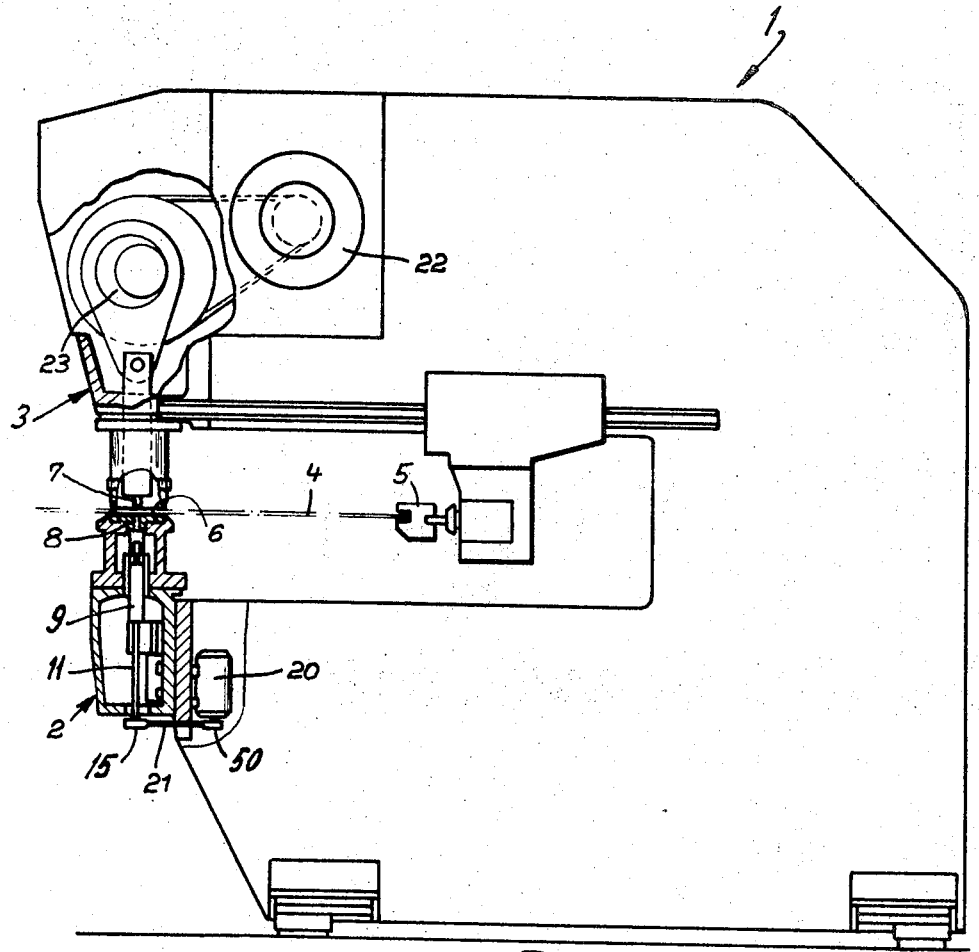
FIG. 1 is a partial side elevational and partial sectional view of a milling machine having a nibble tool constructed in accordance with the invention.

Referring to the drawings, in particular, the invention embodied therein comprises a milling machine generally designated 1, having a milling mechanism contained in a lower portion 2 and a nibbler device 3 contained in an upper portion. A workpiece 4 is guided in a manner such that it can rest at one end on guide means 5 and on a machine surface 6. The workpiece 4 is automatically guided by guide means 5 to allow a desired contour to be machined on the workpiece. An example of such guide means is described in the Leibinger Pat. No. 3,144,798.

In accordance with the invention, a nibble punch or nibble tool 7 works from the top portion of the machine downwardly while a cutter or milling tool 8 is fed or adjusted from below.

In accordance with the method of the invention, a desired contour is formed on a workpiece 4 using the nibble tool to pre-cut or pre-nibble the workpiece except for a small edging which may be from about 0.2 to 0.3 millimeter wide after the nibbling operation is completed. The workpiece 4 is then finish machined by a fine-toothed fast rotating cutter such as a cutter 8. During the cutting operation, the nibble punch 7 is moved to an upper dead center position and out of engagement with the workpiece 4. During nibbling, on the other hand, the cutter 8 is moved upwardly into an operative position.

The apparatus includes a hydraulic device which includes a cylinder 9 which is axially displaceable with the cutter 8 and which serves to position the cutter shaft 11. Means such as a lever having a forked end (not shown) is connected to the cylinder for shifting it upwardly or downwardly. The cylinder 9 is mounted on a suspension which is not shown in detail but which includes a spline or polygon shaft 11 which is movable in either direction as indicated by the double arrow 10 (FIG. 2). The shaft 11 is supported for axial movement in double bearings 12 and 13 which are fitted on a spline of a polygon sleeve 14. This sleeve 14 includes a pulley portion 15 which is driven by a belt 21 from a pulley 50 of a cutter motor 20 as indicated in FIG. 1. The outer rings of the bearings 12 and 13 are secured in a collar bushing 16 which is connected with the milling arrangement within the housing 2.

The cylinder 9 may move downwardly to the dotted line position indicated in FIG. 2 in which the cutter 8 also assumes the lowermost dotted line position indicated. Cylinder 9 is mounted for longitudinal displacement in the bushing 17 and it is sealed in the upward direction by a packing 19.

The nibble punch 7 has its own driving motor 22 which is mounted in the top portion of the miller 1 for driving the nibble punch 7. The motor operates through an eccentric 23.

After completion of the nibble operation, the die 28 which is mounted adjacent the machine surface 6 is removed and replaced by an insert 25 which cooperates with the cutter 8. The insert 25 offers a bearing surface 26 with the workpiece 4 which lies at the same level as the nibbler in work surface. The central bore 27 is greater than the bore 28 of the die so that the thicker cutter 8 can pass through upwardly. Above the insert 25 at a distance 29 there is a hold down or press bed 30. The distance 29 corresponds to the thickness of the workpiece and it is adjustable. Also adjustable by the mount 31 is the upper end position of the cutter 8. The stroke height of the cutter 8 is indicated by the numeral 32. The installation and adjustment of the cutter 8 are effected in a manner customary for milling machines.

The hold down 30 is hollow and has a feed bore 33 for compressed air and a plurality of outflow bores 34 which are arranged obliquely around the cutter 8. This produces a compressed air curtain around the cutter 8. The compressed air flows through the bore 27 of the insert 25 and discharges through a suction bore 35. The suction bore 35 is connected with a suction device (not shown).

In order to prevent the nibble chips from dropping onto the cylinder 9 and the hydraulic system, there is provided a pivotal chip chute 36 which is arranged below the insert 25 in a position to receive the chips and to conduct them to the outside of the device.

Figures 3A, 3B:
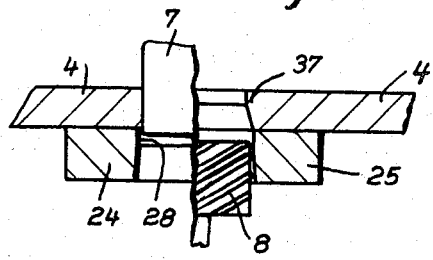
FIG. 3a is an enlarged partial section of a portion of the machine indicated in FIG. 2 with the nibble tool in an operative position.
FIG. 3b is a view similar to FIG. 3a, with the milling cutter in an operative position.

As indicated in FIGS. 3a and 3b, the arrangement of the various parts is chosen depending on whether the workpiece 4 is to be operated upon by the nibble punch 7 or by the cutter 8. In FIG. 3a, the workpiece 4 is shown being operated upon by the nibbler punch 7 and in FIG. 3b, the workpiece is being operated upon by the cutter 8. When the nibbler punch 7 is being used, the die 24 is positioned in place and it has a bore 28 that is less than the internal diameter of the central bore 27 of the insert 25 used with the cutter 8. The lands 27, indicated in FIG. 3b, are formed by the nibbling operation and they are removed by the cutter 8.

For comparison of the conventional chipping output with that of the machine of the present invention, the following numerical values are given:

In the contour cutting of a sheet which is machined with a milling cutter having about 12 mm. in diameter and a power drive of about 2 kilowatts, a rate of feed of approximately 60 to 80 mm. per minute is attainable.

With the same drive power, in a 12 mm. nibble punch rate of feed from 1000 to 1200 mm. per minute can be attained in nibbling. The nibbled edge can be re-cut with a rate of feed of about 3 meters per minute. From these numerical values, it can be seen that despite the two successively occurring operations, a rapid working of the whole workpiece is possible.

The total machining time required for cutting with the inventive method is about only one-tenth of the time required for cutting out of the full. The comparable machines speed $v_m$ results from the nibbling speed $v_n$ and the recutting speed $v_f$ according to the formula $$v_m = \frac{v_n \times v_f}{v_n + v_f}$$

For this one obtains from $$v_m = \frac{3000 \times 1000}{4000}$$

$$\frac{mm.}{min.} = 750 \text{ mm./min.}$$

as against 60–80 mm./min.

What is claimed is:

1. A milling machine comprising supporting base means for a workpiece, a nibbling tool mounted on one side of said supporting base means and connected to means for reciprocating said tool to effect the nibbling of the workpiece, a cutter mounted on the opposite side of said supporting base means and connected to means for rotating said cutter for milling cutting the workpiece, and positioning means associated with said nibbler and said cutter for selectively shifting said nibbler and said cutter into an out of an operative position in respect to the workpiece on said support base means.

2. A milling machine, according to claim 1 wherein said cutter and said nibble punch are arranged coaxially.

3. A milling machine, according to claim 2, wherein said positioning means includes means mounting said cutter for advancing and retracting movements in axial directions.

4. A milling machine, according to claim 1, wherein said positioning means includes an overhead mount for said nibbler and an underlying mount for said cutter, a supporting cylinder for said cutter, and means mounting said supporting cylinder in said underlying mount for said cutter for vertical reciprocal movement.

5. A milling machine, according to claim 4, including a hydraulic drive connected to said cylinder for shifting said cutter.

6. A milling machine, according to claim 4, including a separate drive motor connected to said nibbling tool for reciprocating said nibbling tool and a separate cutting motor connected to said cutting tool for rotating said cutting tool.

7. A milling machine, according to claim 4, wherein said setting base means includes an interchangeable receiving die for said nibbling tool and an insert for said cutter, said cutter having a greater diameter than said nibbling tool and said insert having a larger bore than said die to permit upward passage of said cutter.

8. A milling machine, according to claim 1, wherein said machine includes means for automatically operating said machine as a milling contour machine.

9. A milling machine, according to claim 4, including a retractible chip chute arranged for receiving chips cut away by said nibbler.

10. A milling machine, according to claim 4, including a spline shaft connected to said cylinder, means mounting said shaft to permit axial movement thereof, and drive pulley means on said shaft for rotating said cutter.

References Cited

UNITED STATES PATENTS

| 2,164,616 | 7/1939 | Manny | 29—564X |
| 2,915,164 | 12/1959 | Sharpe | 29—568X |
| 3,469,306 | 9/1969 | Cloup | 29—564 |

GIL WEIDENFELD, Primary Examiner

U.S. Cl. X.R.

29—558; 90—13.5